June 17, 1969 P. KNORR 3,450,503
APPARATUS FOR OXIDIZING LEAD

Filed Nov. 12, 1964 Sheet 1 of 2

INVENTOR.
PETER KNORR

BY *James E. Bryan*
ATTORNEY.

June 17, 1969 P. KNORR 3,450,503
APPARATUS FOR OXIDIZING LEAD
Filed Nov. 12, 1964 Sheet 2 of 2

INVENTOR.
PETER KNORR
BY James E. Bryan
ATTORNEY.

United States Patent Office 3,450,503
Patented June 17, 1969

3,450,503
APPARATUS FOR OXIDIZING LEAD
Peter Knorr, Essen, Germany, assignor to Th. Goldschmidt, A.G., Essen, Germany, a corporation of Germany
Filed Nov. 12, 1964, Ser. No. 410,393
Int. Cl. C01g 21/10
U.S. Cl. 23—277
8 Claims

ABSTRACT OF THE DISCLOSURE

This invention relates to a process and apparatus for oxidizing lead in which a zone of high gas turbulence is produced by the convergence of a plurality of gas jets; molten lead is atomized in this zone and preferably also is burned therein. Particularly good results are obtained if molten lead is introduced into the zone of high gas turbulence in the form of a thin stream. The molten stream is atomized and the lead is distributed in the turbulent zone in extremely finely dispersed form. The atomized lead is burned to lead oxide either immediately or in a separate combustion zone mounted adjacent to the turbulent zone.

---

Figure 5:
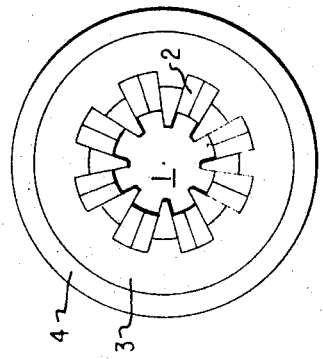

The oxides of lead, particularly $Pb_3O_4$, which is known under the name minium, are among the oldest mineral colors and a number of processes and apparatuses have been proposed for preparing these oxides. It is especially desirable to prepare the oxides in the required purity and with a particle size which is a small as possible. Those processes in which the lead pigments are prepared according to the wet method have not become practical for reasons of economics and the primary industrial processes are those in which the lead is oxidized in a molten, atomized state.

Since the formation of litharge, PbO, is an exothermic reaction whereas minium, on the other hand, splits off oxygen at temperatures above 550° C., almost all industrial processes produce litharge as a first oxidation product which is then oxidized to minium in a second process step. However, litharge is a versatile and widely used product and may be employed directly as a pigment or it may serve as a starting material for the manufacture of other mineral colors.

Exemplary of processes for the preparation of lead oxides are the Barton process, which is described in German Patents Nos. 228,729, 229,265, and 266,348, and a process developed by Th. Goldschmidt, A.G. which is described in German Patents Nos. 439,795, and 463,271.

In the Barton process, molten lead is superficially whirled up by a powerful stirring apparatus. The whirled up and centrifuged constituents are spattered on a baffle plate and the finely dispersed lead resulting therefrom is oxidized by a strong air blast.

In the process developed by Th. Goldschmidt, A.G. molten lead is dropped through a shaft furnace in which it is vaporized at temperatures above 1400° C. and oxidized to PbO.

These and other known processes have a number of disadvantages which can not be eliminated or which can be eliminated only by the creation of other disadvantages. For example, common to all of the known processes is the disadvantage that relatively large installations are required for the production of a given amount of lead oxide. An increase in throughput is always accompanied by an enlargement of the pigment particles which leads to undesirable phenomena such as, for example, too rapid a sedimentation of the pigment in a finished color, a reduced yield per surface area, and changes in the shade of the pigment.

In addition to the disadvantage that the particle size is too coarse, there is also a decrease in the passivation effect on steel and iron.

The present invention provides a process and apparatus in which lead oxides, especially litharge, may be produced in superfine particle sizes with high space-time yields in a manner which is highly economical and with a constant and reproducible quality. In the present invention, molten lead is atomized by means of gas jets and burned.

In a preferred embodiment of the invention, a zone of high gas turbulence is produced by the convergence of a plurality of gas jets, molten lead is atomized in this zone, and preferably also is burned therein. Particularly good results are obtained if the molten lead is introduced into the zone of high gas turbulence in the form of a thin stream. The molten stream is atomized and the lead is distributed in the turbulent zone in extremely finely dispersed form. The atomized lead is burned to lead oxide either immediately or in a separate combustion zone mounted adjacent to the turbulent zone. It is also advantageous to supply oxygen or an oxygen-containing gas and the heating gas separately. Moreover, the oxygen-containing gas can be preheated if desired. Once the combustion of the atomized lead has begun, the supply of heating gas may be reduced or eliminated entirely if the exothermic heat of reaction is employed.

Air may be employed as the oxygen-containing gas and may, if desired, be enriched with oxygen. The throughput of the process may be further increased by admitting the air under superatmospheric pressure, for example, in the range of 2 to 10 atmospheres gauge. In this latter case, the process may be operated in a particularly simple manner by producing the zone of high turbulence with compressed air or other oxygen-containing gas directly, i.e., without using any additional gas under pressure. For this purpose, a plurality of gas jets, as stated above, are so positioned that they converge and the stream of molten lead is introduced into the turbulent zone formed at the point of convergence of the gas jets.

Ordinary illuminating gas as supplied by local gas companies may be employed as a heating gas but other fuels, such as other hydrocarbon gases, heating oils, and the like, may also be employed.

The atomizing of the molten lead prior to combustion can be further enhanced if the heating gas is compressed and supplied to the turbulent zone under pressure. This mode of operation is, however, not employed in most cases since, once the oxidation of the lead has begun, so much heat is liberated by the exothermic reaction that the supply of heating gas may be either eliminated or reduced to a minimum and the minimum quantity of gas required is not sufficient to atomize the molten lead.

Accordingly, it is possible to utilize illuminating gas as a heating gas which is under normal delivery pressure (approximately 200 mm. water column). This gas is preferably introduced in a manner such that it mixes with the gas under pressure used to form the turbulent zone and, after ignition, yields a uniform lead flame. Since the intermixing of the heating gas with the combustion air in the turbulent zone occurs automatically, it is sufficient to admit the heating gas at a point slightly above the point of convergence of the pressure gas used to form the turbulent zone. It is also possible to admit the heating gas after the lead has been atomized but, in such case, an agglomeration of the primarily formed lead droplets may occur if the combustion is delayed too long.

In a particularly effective embodiment of the invention, a plurality of pressure gas jets are directed angularly downwardly toward a point where they converge with each other and molten lead is passed in a stream downwardly toward the point of convergence, which point is also supplied with heating gas. The pressure gas jets will thereby form a cone which is tapered in the downward direction and in the apex of which the turbulent zone required for the atomization of the lead is produced. The lead at the inside of the cone flows toward the turbulent zone in the form of a thin stream or jet. The heating gas is preferably admitted in proximity to the turbulent zone and is there mixed with the whirled and atomized lead.

Although the present process is described with particular reference to the oxidation of lead, it can also be employed to oxidize other relatively low melting point metals such as zinc and tin, for example.

The present invention also provides an apparatus for performing the novel process. The apparatus includes a furance having a combustion chamber preferably in the shape of a vertical shaft and which includes means at the top thereof for supplying molten lead to the combustion chamber. The furnace has a plurality of gas nozzles so mounted therein that gas jets emanating therefrom converge approximately in the path of the stream of molten lead supplied to the combustion chamber. The pressure gas nozzles preferably are arranged concentrically around the lead inlet point and are directed angularly downwardly. This construction ensures an extremely fine atomization of the lead by the pressure gas and it has been found particularly advantageous to provide the pressure gas nozzles at the height of the lead inlet point or lower than the latter since such a construction produces a zone of especially high turbulence. This effect is further accentuated by mounting the nozzles so that they enclose an angle of from 5 to 20°, preferably 10 to 12°, with the vertical.

Since the process of the invention can be operated in a manner such that the oxygen-containing gas required for the oxidation is also used as a pressure gas for the atomization of the lead, it is advantageous to mount the nozzles so that they may be fed with an oxygen-containing gas.

Also, inlets for heating gas are provided. Heating gas nozzles which are concentrically mounted with respect to the combustion zone have been found to be particularly advantageous. The heating gas nozzles preferably are directed angularly downwardly and the gas jets emanating therefrom preferably converge slightly above the point of convergence of the pressure gas jets.

In a preferred embodiment of the apparatus of the present invention, the top of the combustion chamber has the form of an annular chamber, preferably fabricated from metal, which serves as a pressure gas inlet and has the pressure gas nozzles therein. This annular chamber preferably is provided with a connecting pipe either at the upper side or at the outer jacket surface thereof and the pressure gas inlet may be flanged thereon. The supply of the compressed air is suitably effected in a direction which is tangential to the circumference of the annular chamber. This guarantees a uniform formation of the pressure gas jets.

It is advantageous to mount a second annular chamber below the pressure gas nozzles, the second chamber being provided with nozzles for the introduction of heating gas into the combustion zone and the inner diameter of which is approximately equal to the inner diameter of the combustion chamber.

The molten lead is preferably supplied to the furnace through a central aperture of the annular chamber forming the top of the combustion zone and carrying the pressure gas nozzles. It has also been found desirable to provide the lead supply device with a siphon-type seal or closure so that the furnace is protected against the inflow of extraneous air.

The diameter of the pressure gas nozzles depends upon the pressure at which the pressure gas is introduced into the combustion chamber. Although atomization of the molten lead stream is enhanced by an increase in the gas pressure, with the nozzle diameters remaining constant, there is a limit to which the pressure of the atomizing gas can be increased beyond which limit the particle size of the atomized lead particles again becomes larger. Possibly, this is due to an increased cooling effect on the surface of the molten lead stream or jet. It has been experimentally determined that the best atomization as regards particle size is attained using a nozzle diameter of 2.5 mm. with a pressure gas under a pressure of 3 to 5 atmospheres gauge, a nozzle diameter of 2 mm. with a pressure gas under a pressure of 4 to 6 atmospheres gauge, and a nozzle diameter of 1.5 mm. with a pressure gas under a pressure of 7 to 9 atmospheres gauge.

Also, the turbulence in the combustion chamber may be further increased by providing the inner wall of the shaft-like chamber with projections. For example, in one horizontal course, individual bricks of the furnace brick lining, for example every second or third brick, may be forwardly projected into the inner space or chamber and the projecting bricks of the inner furnace wall may also be vertically offset with respect to each other.

Figure 6:
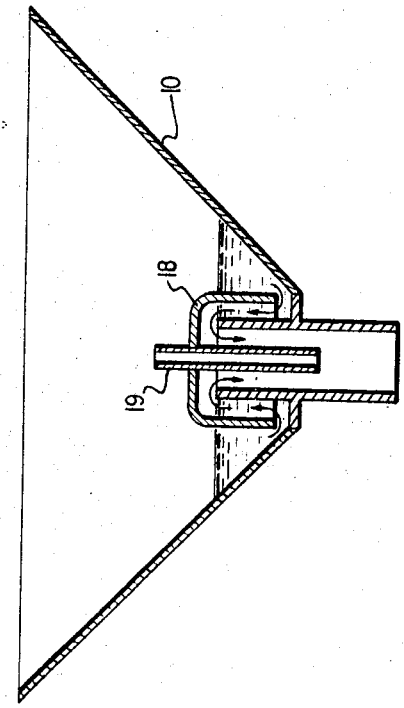
Figure 1:
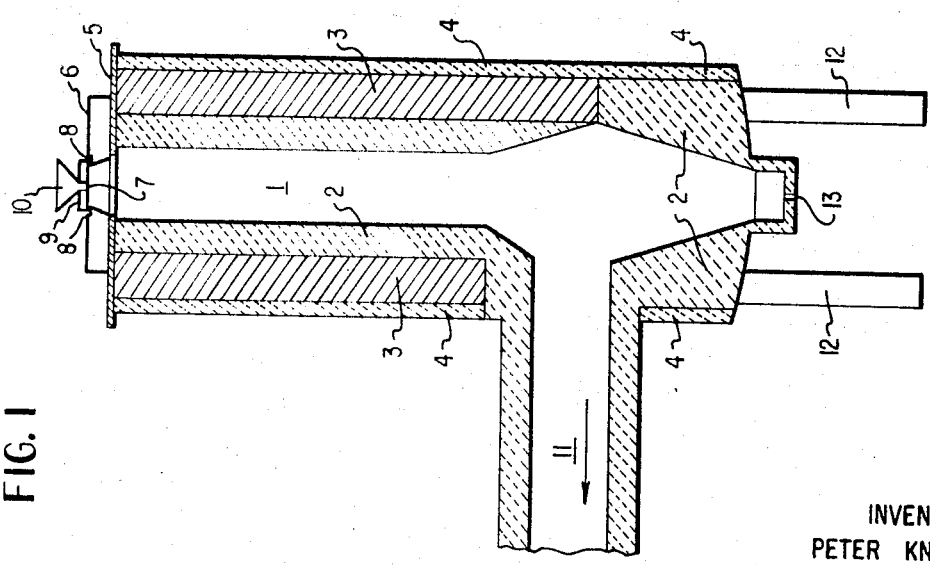
Figure 2:
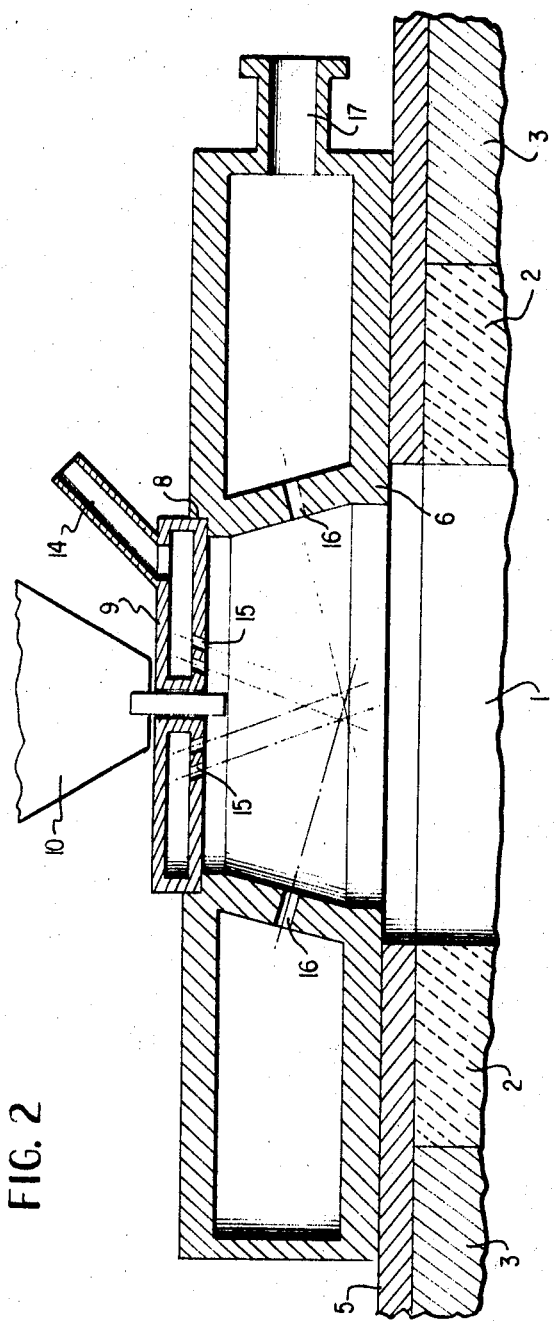
Figure 4:
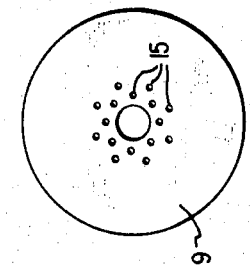
Figure 3:
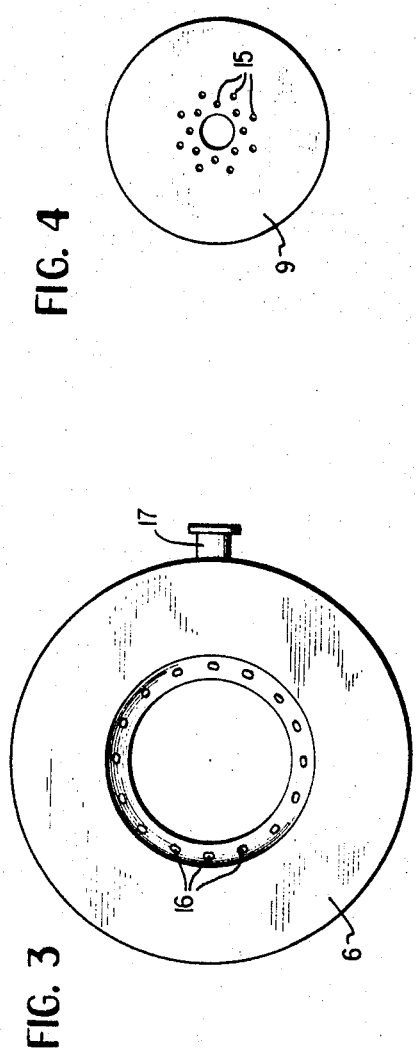

One embodiment of an apparatus for performing the process of the present invention will be further illustrated by reference to the accompanying drawings in which:

FIGURE 1 is a schematic view in section of a furnace having atomizing and combustion means at the upper end thereof, FIGURE 2 is a detailed view in section of the lead atomizing and combustion means, FIGURE 3 shows one arrangement of heating gas nozzles in an annular chamber, in a bottom view thereof, FIGURE 4 is a bottom view of an annular chamber in which pressure gas nozzles are provided, FIGURE 5 illustrates one form of construction of the furnace brick lining, and FIGURE 6 illustrates a siphon-type closure for the lead supply.

As shown in FIGURE 1, the apparatus of the invention consists of a shaft furnace having a vertical combustion chamber 1. The walls thereof are lined with brick in known manner for heat insulation and to prevent attack by molten or vaporous lead or lead oxide. Thus, the combustion chamber may be delimited by an essentially annular wall formed by curved magnesite bricks. The outer brickwork 4 may be made with light fire bricks and the intermediate layer 3, of tar magnesite, may be tamped in between the inner and outer brickwork.

The combustion chamber 1 is covered at the top thereof by means of a metal plate 5 having a central aperture therein, which aperture has substantially the same diameter as the combustion chamber 1. An annular chamber 6 is mounted on the cover plate 5 coaxially with the combustion chamber 1 and has a central aperture 7 therein. The chamber 6 is also provided with a plurality of heating gas nozzles and a heating gas inlet, not illustrated in FIGURE 1. Mounted on the annular chamber 6, in an annular groove 8, is a second annular chamber 9 having a central aperture therein and including pressure gas nozzles and a pressure gas inlet, not shown in FIGURE 1. Molten lead is introduced into the combustion chamber through the funnel-shaped lead inlet 10 and the central aperture 7 of the annular chamber 6.

The shaft furnace is supported on a frame 12 and includes a discharge 11 through which the products of the process may be withdrawn. During start-up of the shaft furnace, i.e., prior to ignition of the atomized and whirled-apart lead, coarser lead particles may at times be obtained. It is also possible, during prolonged use of the furnace, that small pieces of the brick furnace lining may break away or crumble. These are collected at the bottom of the shaft furnace and may be removed therefrom by means of a taphole 13.

It is also possible to construct the furnace so that the axes of the combustion chamber 1 and the discharge 11 intersect in the form of a quadrant rather than at a right angle with respect to each other.

The upper portion of a shaft furnace is illustrated on an enlarged scale in FIGURE 2. The annular chamber 6, which is provided with a side connecting pipe 17 for the supply of a heating gas, is illustrated in detail. The heating gas is introduced into the combustion chamber through the concentrically mounted nozzles 16.

The annular chamber 9 is mounted on the annular chamber 6 in a recess 8 in the latter and a lead supply funnel 10 is provided in the central aperture of the annular chamber 9. Pressure gas is fed to the annular chamber 9 through the tangential inlet 14. The reference numeral 15 designates a plurality of pressure gas nozzles through which the pressure gas flows into the combustion chamber.

In order to obtain a uniform flame zone, it is desirable to arrange the heating gas nozzles concentrically in the annular chamber 6, as shown in FIGURE 3.

FIGURE 4 shows one arrangement of the pressure gas nozzles 15 being provided around the lead supply aperture of the annular chamber 9. The axes of these pressure gas nozzles enclose an angle preferably of 10 to 12° with the vertical.

FIGURE 5 shows one form of brick lining for the furnace which enhances the turbulence therein. In this construction, the curved magnesite bricks in the third, sixth, ninth, etc. circumferential positions are projected forwardly into the combustion chamber. The staggered provision of the individual courses of bricks results in an inner surface of the furnace which contributes substantially to the turbulence of the gas stream therein.

FIGURE 6 illustrates a siphon-type closure 18 for the lead supply funnel 10. The lead flows from a melting device, not shown, into the funnel and then flows in the direction of the arrows from the inlet funnel through the central aperture 7 into the combustion chamber 1. In this construction, a tube 19 may also be provided in the siphon-type cover 18 through which additional gas, for example oxygen or additional heating gas, may be introduced into the combustion chamber.

In the operation of the process, molten lead in a thin jet or stream flows through the inlet 10 into the central aperture 7 of the annular chamber 6. The lead stream thus arrives at the point of convergence of the pressure gas jets emanating from the nozzles 15 and is atomized. Heating gas from the nozzles 16 is admitted into this zone of violent turbulence. Once the mixture formed has been ignited, combustion is maintained by a uniform supply of lead, oxygen-containing pressure gas, and heating gas, if necessary. The lead oxide which is formed during the combustion is discharged from the shaft furnace through the side discharge 11 and may be conveyed to conventional collector devices, for example electrical precipitators, or it may be further processed.

It will be obvious to those skilled in the art that many modifications may be made within the scope of the present invention without departing from the spirit thereof, and the invention includes all such modifications.

What is claimed is:

1. A furnace for the oxidation of lead comprising a combustion chamber, means at the top of the chamber for supplying molten lead thereto, a plurality of first gas nozzle means directed angularly downwardly in the chamber and enclosing an angle of 5 to 20° with the vertical whereby gas jets emanating therefrom converge at a point substantially coincident with the line of flow of molten lead supplied to the chamber, and a plurality of second gas nozzle means positioned in the chamber so that heating gas jets emanating therefrom are angularly downwardly directed and converge at a point slightly above the point of convergence of the gas jets from the first gas nozzle means.

2. A furnace according to claim 1 in which the first gas nozzle means are positioned concentrically with respect to the means for supplying molten lead to the chamber and are directed angularly downwardly.

3. A furnace according to claim 1 in which the first gas nozzle means are positioned at substantially the same height as the inlet point of the molten lead into the chamber.

4. A furnace according to claim 1 in which means are included for feeding an oxygen-containing gas to the first gas nozzle means.

5. A furnace according to claim 1 in which the top of the combustion chamber is an annular chamber having the nozzle means therein.

6. A furnace according to claim 5 in which a second annular chamber is mounted below the first recited annular chamber, the second chamber having the second gas nozzle means for the introduction of a heating gas therein.

7. A furnace according to claim 1 in which the means for supplying molten lead to the combustion chamber has a siphon-type closure.

8. A furnace according to claim 1 in which the interior of the combustion chamber has projections thereon which increase gas turbulence.

References Cited

UNITED STATES PATENTS

| 385,235 | 6/1888 | Bradley | 23—146 |
|---|---|---|---|
| 1,511,215 | 10/1924 | Calbeck | 23—146 |
| 1,856,679 | 5/1932 | Williams et al. | 18—2.5 |
| 2,497,095 | 2/1950 | Nevins et al. | 23—262 |
| 3,085,865 | 4/1963 | Long et al. | 23—277 |

JAMES H. TAYMAN, JR., *Primary Examiner.*

U.S. Cl. X.R.

23—146, 284; 264—5, 12, 14